Sept. 21, 1943.     I. GREENFIELD     2,329,757

EYEGLASS

Filed Dec. 9, 1942

INVENTOR.
ISIDOR GREENFIELD
BY
his ATTORNEY

Patented Sept. 21, 1943

2,329,757

UNITED STATES PATENT OFFICE 2,329,757

EYEGLASSES

Isidor Greenfield, Brooklyn, N. Y.

Application December 9, 1942, Serial No. 468,447

2 Claims. (Cl. 15—250)

My invention relates to devices adaptable for use with eye-glasses and refers particularly to devices adapted for the cleaning of the glasses, or lenses of eye-glasses.

One of the objects of my invention is a device whereby the glasses, or lenses, of eye-glasses can be cleaned without removing the eye-glasses from their normal position while in use.

Another object of my invention is a device whereby the glasses, or lenses, of eye-glasses can be cleaned without removing the eye-glasses from their normal position while in use, said device being a separable element from the eye-glasses.

Another object of my invention is a device whereby the glasses, or lenses, of eye-glasses can be cleaned without removing the eye-glasses from their normal position while in use, said device being of such a character as not to disfigure the appearance of the eye-glasses.

Another object of my invention is a device for cleaning the glasses, or lenses of eye-glasses which is simple in construction, economically producible and of such construction as to allow of its being carried without inconvenience.

During the use of eye-glasses they frequently become clouded with steam, fog, dust or other deposits which reduce their clearness of vision or make it impossible to continue their use until the lenses have been cleaned from the objectionable deposits.

In the absence of some special method of cleaning the lenses, the eye-glasses must be removed from their normal position, the deposits wiped away and the eye-glasses returned to their original position.

While this method of cleaning the lenses of eye-glasses is always objectionable because of the time and inconvenience incident to accomplish the desired result, it is particularly objectionable when the wearer must wear his eye-glasses in an atmosphere containing steam or fine particles of dust, as the time required for removing the eye-glasses, cleaning the lenses and returning the eye-glasses for observation may seriously affect the performance of the work and delay the period of production.

The devices of my invention overcome all of the above-mentioned and other objections incident to the described cleaning performance, and present means whereby the lenses of eye-glasses may be easily, thoroughly and quickly cleaned without removing them from their normal position of use.

Further, it is evident that a device of the described usefulness must be of such construction that it will not interfere with the appearance of the eye-glasses when the cleaning operation is not being performed.

I have accomplished this desirable result by constructing a cleaning element which is separable from the eye-glasses, which allows the eye-glasses to have their normal appearance and which can be readily attached to and removed from the frames of the lenses without removing the eye-glasses from their normal position.

The above-mentioned and other desirable features of devices of my invention can be readily understood by a consideration of this specification and its accompanying drawing, in which similar parts are designated by similar numerals.

Figure 1:
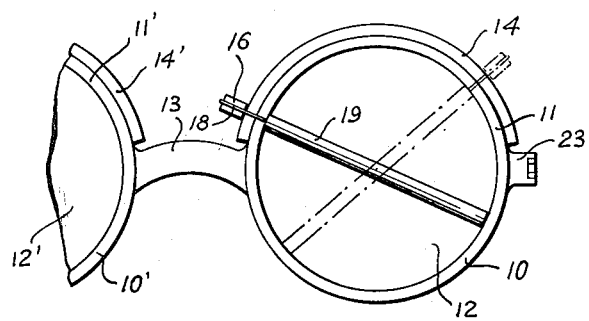
Figure 1 is a front view of a portion of a pair of spectacles to which my cleaning device is attached.
Figure 2:
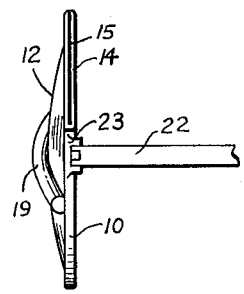
Figure 2 is a side view of the device of Figure 1.
Figure 3:
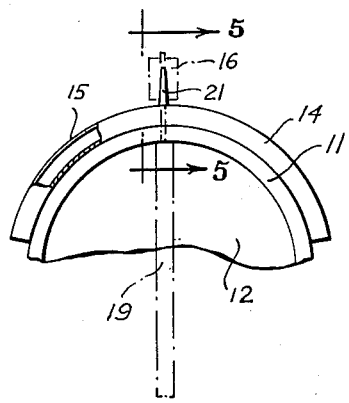
Figure 3 is an enlarged view of that portion of Figure 1 showing my cleaning device attached to the frame of a pair of spectacles.

The particular form of a device of my invention illustrated in Figures 1 to 6, inclusive, comprises an eye-glass, or spectacle frame having a lower portion 10 and an upper portion 11, here shown as a continuous unitary frame, the frame 10, 11 carries an eye-glass on lens 12, and is connected by the nose-bridge 13 to a corresponding frame 10', 11' carrying the eye-glass, or lens 12'.

Carried by the frame member 11, and removably or fixedly attached thereto, is a hollow cylindrical member 14 having a longitudinally positioned opening 15 therein. A similar hollow cylinder member 14' is carried by the frame member 11'.

The element of my invention adapted for cleaning the lens, or eye-glass, comprises a base member 16 having an upwardly extended recess 17 therein. The base 16 carries the two downwardly extended legs 18, 18' preferably made of a resilient wire, the lower portions of the legs 18, 18' being covered with rubber, or other suitable glass cleaning material, 19, 19'.

Positioned within the hollow cylindrical member 14, and longitudinally movable therein is a member 20, having an arm 21 extending through the opening 15 of the cylindrical member 14, the arm 21 being adapted to fit within the recess 17 of the base 16.

The eye-glass shown in the drawing is of the ordinary spectacle form, having an ear-piece 22 hingedly attached to the stud 23 of each frame, although it is evident that my invention can be as readily attached to eye-glasses of the nose-attaching form.

Figure 4:
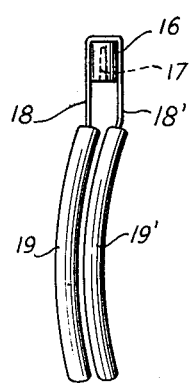
Figure 4 is a side view of my cleaning device.

The eye-glass illustrated in the drawing may be employed in the usual manner without the cleaning device shown particularly in Figure 4. When it is desired to clean the glass, the cleaning device shown particularly in Figure 4 is placed upon the upper portion of the eye-glass with the cleaning legs 19, 19' upon opposite sides of the glass and moved downwardly until the arm, or piece 21 of the movable member 20 is inserted within the recess 17 of the base 16. The device will then be in the position shown in Figure 1 in full lines and the cleaning arms 19 and 19' will be in contact with the two sides of the glass 12.

As the base member 16 is moved around the periphery of the frame, the cleaning legs 19, 19' will move over both surfaces of the glass, thus cleaning them. For instance, when the base 16 has been moved clock-wise, a portion of its possible movement, it and the cleaning legs will be in the position shown in dot-and-dash lines in Figure 1.

It will be noted that when the glass has been cleaned, the device of Figure 4 can be removed by simply raising the base member 16 without removing the glasses from their original position.

Figure 6:
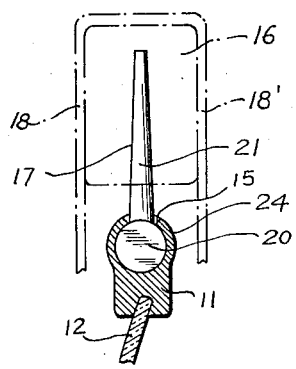
Figure 6 is an enlarged section of a view similar to Figure 5 in which the frame of an ordinary pair of spectacles acts as the hollow cylindrical member for use with my cleaning device.
Figure 5:
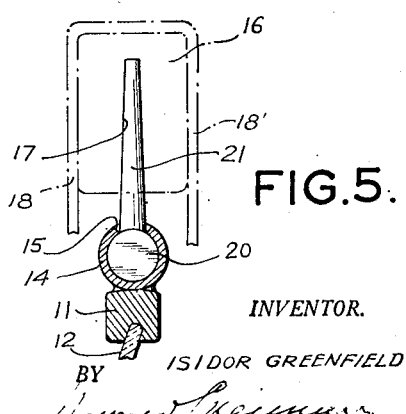
Figure 5 is an enlarged section through the line 5—5 of Figure 3.

In the modified form of my device shown in Figure 6, the hollow cylindrical member is formed in the frame portion 11 and is not an additional unit as shown in the preceding figures.

It will thus be seen that my invention presents devices whereby the lenses, or glasses of eye-glasses may be cleaned without removing them from their normal position during use, and without disfiguring the appearance of the eye-glasses when the cleaning process is not being performed.

I do not limit myself to the particular number, size, shape, material or arrangement of parts as disclosed and described, as these are mentioned solely for the purpose of clearly describing my invention.

What I claim is:

1. In combination, an eye-glass frame, a hollow upper portion which has a longitudinal opening therein, a member longitudinally movable within said hollow upper portion of said frame, a member carried by said movable member extending through said opening of said frame, a lens carried by said frame and means carried by said movable member adapted to abut upon the two faces of said lens.

2. In combination, an eye-glass frame, a hollow upper portion which has a longitudinal opening therein, a member longitudinally movable within said hollow upper portion of said frame, a member carried by said movable member extending through said opening of said frame and a cleaning device operative therewith comprising a base member having a recess in the lower portion thereof adapted to receive the extended member of said movable member and extended spaced members carried by said base adapted to abut upon the two faces of a lens carried by said frame.

ISIDOR GREENFIELD.